United States Patent [19]

Lee

[11] Patent Number: 5,733,023

[45] Date of Patent: Mar. 31, 1998

[54] DUST COVER OF A FACSIMILE APPARATUS

[75] Inventor: Jeon-Ho Lee, Gumi, Rep. of Korea

[73] Assignee: SamSung Electronics Co., Ltd., Suwon, Japan

[21] Appl. No.: 686,414

[22] Filed: Jul. 26, 1996

[30] Foreign Application Priority Data

Jul. 28, 1995 [KR] Rep. of Korea ............... 22903/1995

[51] Int. Cl.$^6$ ............................................. A47B 97/00
[52] U.S. Cl. ................................. 312/208.3; 312/223.1
[58] Field of Search .......................... 312/208.3, 223.1,
312/223.4, 208.1; 150/165, 154; 400/691,
693, 694; 358/400

[56] References Cited

U.S. PATENT DOCUMENTS

| D. 240,882 | 8/1976 | Knight | 150/165 X |
|---|---|---|---|
| 2,492,262 | 12/1949 | Boyden et al. | |
| 4,436,965 | 3/1984 | Morse | 179/184 |
| 4,546,947 | 10/1985 | Gesten | |
| 4,555,600 | 11/1985 | Morse | 179/184 |
| 5,096,317 | 3/1992 | Phillippe | 312/271 X |
| 5,317,422 | 5/1994 | Fujimoto | 358/400 X |
| 5,329,377 | 7/1994 | Gregg | 358/400 |
| 5,343,590 | 9/1994 | Downies | 379/40 |
| 5,370,468 | 12/1994 | Chern et al. | |
| 5,417,488 | 5/1995 | Horton | 312/208.3 |
| 5,464,205 | 11/1995 | Bang | |

Primary Examiner—Peter M. Cuomo
Assistant Examiner—Janet M. Wilkens
Attorney, Agent, or Firm—Robert E. Bushnell, Esq.

[57] ABSTRACT

A dust cover for a facsimile apparatus covers the main body of the facsimile apparatus including key operation panels and a document loading port except an attached telephone receiver. The dust cover protects the facsimile apparatus from dust or spilled liquid drinks, while maintaining the basic facsimile functions of the facsimile apparatus.

16 Claims, 3 Drawing Sheets

5,733,023

1
DUST COVER OF A FACSIMILE APPARATUS

CLAIM OF PRIORITY

This application makes reference to, incorporates the same herein, and claims all benefits accruing under 35 U.S.C. §119 from an application for Dust Cover Of A Facsimile Apparatus earlier filed in the Korean Industrial Property Office on the 28th of Jul. 1995 and there duly assigned Ser. No. 22903/1995.

BACKGROUND OF THE INVENTION

1. Field of the Invention

The present invention relates generally to protective covers and, more particularly, to dust covers for image forming equipment such as facsimile telecommunications apparatus.

2. Description of the Related Art

Image forming equipment such as facsimile telecommunications apparatus, have been generally used within the confines of relatively clean offices. Recently, however, the facsimile apparatus are widely used in various places such as factories or field offices, or occasionally, out-of-doors. Thus, the equipment is all too often exposed to a greater number of human operatiors as well as to ambient dust, process particles and other indoor precipitation, as well as to beverages spilled onto the apparatus by the operators and passers-by. Consequently, minor occurrences of malfunction attributable to temporarily stuck keys on the keypad for example, or to the introduction of liquid phase substances into the internal circuit or into the visual display panel, have become a prevalent source of user dissatisfaction. Contemporary efforts to avoid introduction of extraneous debris into the keypad by fabrication of the keypad as a capacitive touch panel with an outer membrane risk malfunction of the entire keypad whenever ambient matter damages any pan of the membrane because of the integral nature of this type of keypad.

Earlier efforts including the Cover For Calculating Machines And The Like by R. E. Boyden, et al., U.S. Pat. No. 2,492,262, provided a loose, albeit semi-transparent drape over the functional keys of a desktop calculator. More recent efforts, such as the Keyboard Dust Cover Having Integral Copyholder of J. Gesten, U.S. Pat. No. 4,546,947, rely upon a planar, apparently rigid, dust cover to protect a keyboard between period of non-use. These covers provide little or no protection to adjoining pans of the image forming equipment during normal operation.

Moreover, the upper exterior surfaces of image forming apparatus such as facsimile telecommunications equipment, invariably contain external key activated switches other than those in the membrane keypad, such as multiple banks of speed dialing keys and auxiliary function keys, as well as the visual displays and indicator lights. Additionally, adjacent sections of the upper exterior surface are often perforated by one or more slots enabling pan of the upper exterior surface to be opened to gain access to either a roll of thermal paper or a toner cartridge within the equipment. None of these exposed electrical components or slots are protected by the exterior membrane of the keypad.

SUMMARY OF THE INVENTION

It is an object of the present invention, therefore, to provide an improved image forming device.

It is another object to provide a dust cover for image forming equipment able to accommodate transist and discharge of sheets of paper through the equipment while the cover is in place upon the exterior surfaces of the equipment.

2

It is still another object to provide a dust cover for image forming equipment that conforms to protrusions and irregularities on the surfaces of the equipment.

It is yet another object to provide a dust cover for image forming equipment able to lie upon the exterior surfaces and to conform to protrusions and irregularities those surfaces while accommodating normal image formation functions by the equipment.

It is still yet another object to provide a dust cover for image forming equipment, able to prevent malfunction of the equipment due to the dust or spilled beverages, while accommodating performance of the basic functions of the equipment.

It is also an object to provide improved protection of image forming equipment against malfunction and damage due to introduction of ambient debris into the equipment.

To achieve these and other objects of the present invention, a flexible transparent dust cover for image forming equipment such as facsimile telecommunication apparatus characterized by a main body of the equipment including key operation panels and a document loading part except a receiver, being covered with the dust cover. The dust cover extends across the exposed upper surfaces of the main body housing the equipment including key operation panels, protruding functional keys and button operated electrical switches, and a document loading ramp, during normal image formation operations, thereby protecting the control panels, keypads and button operated electrical switches mounted on the exterior surfaces of the equipment malfunction due to dust, particles or spilled drinks, while maintaining the basic image forming and telecommunications functions of the equipment.

BRIEF DESCRIPTION OF THE DRAWINGS

A more complete appreciation of this invention, and many of the attendant advantages thereof, will be readily apparent as the same becomes better understood by reference to the following derailed description when considered in conjunction with the accompanying drawings in which like reference symbols indicate the same or similar components, wherein.

DETAILED DESCRIPTION OF THE PREFERRED EMBODIMENT

Figure 1:
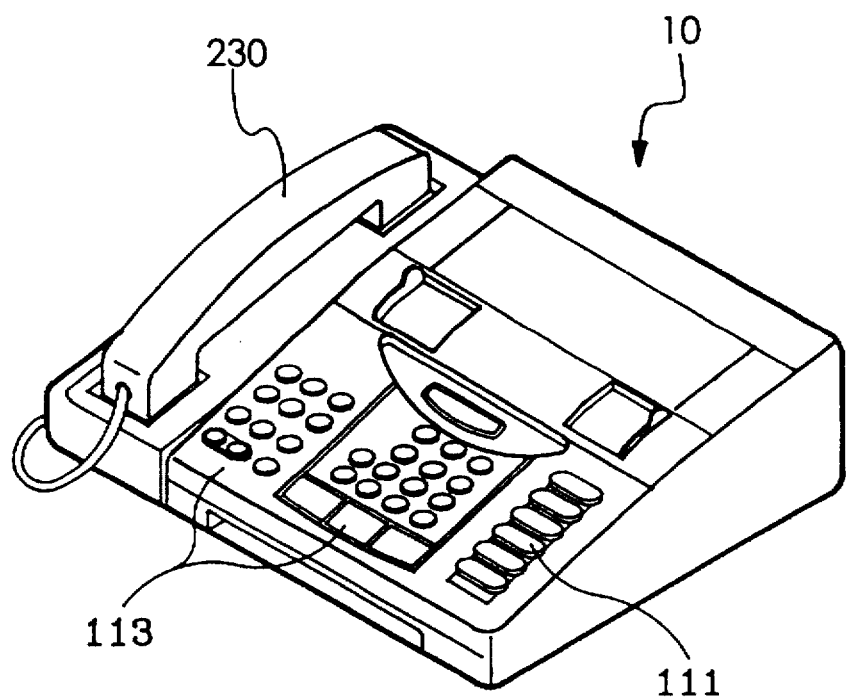
FIG. 1 is a diagram showing a representation of the external shape of a hypothetical facsimile telecommunications apparatus.

Turning now to the drawings, FIG. 1 shows one example of the external shapes of the exposed upper surfaces of a hypothetical representation of one item of image forming equipment such as a unit of facsimile telecommunication apparatus 10 equipped with a telephone handset 230. Different configurations of facsimile apparatus 10 have various external shapes; none however have a dust cover protecting facsimile apparatus 10 from dust or other ambient particles. Therefore, particularly when the facsimile apparatus is used either in a dust ladden environment or outdoors, over time there one or more of the numerous keys in the plurality of arrays forming the several external keypads 111 and 113 either stick or malfunction due to interference of dust, particles or residual precipitate from beverages spilled by either passers-by or by the operators of the facsimile equipment.

Figure 2A:
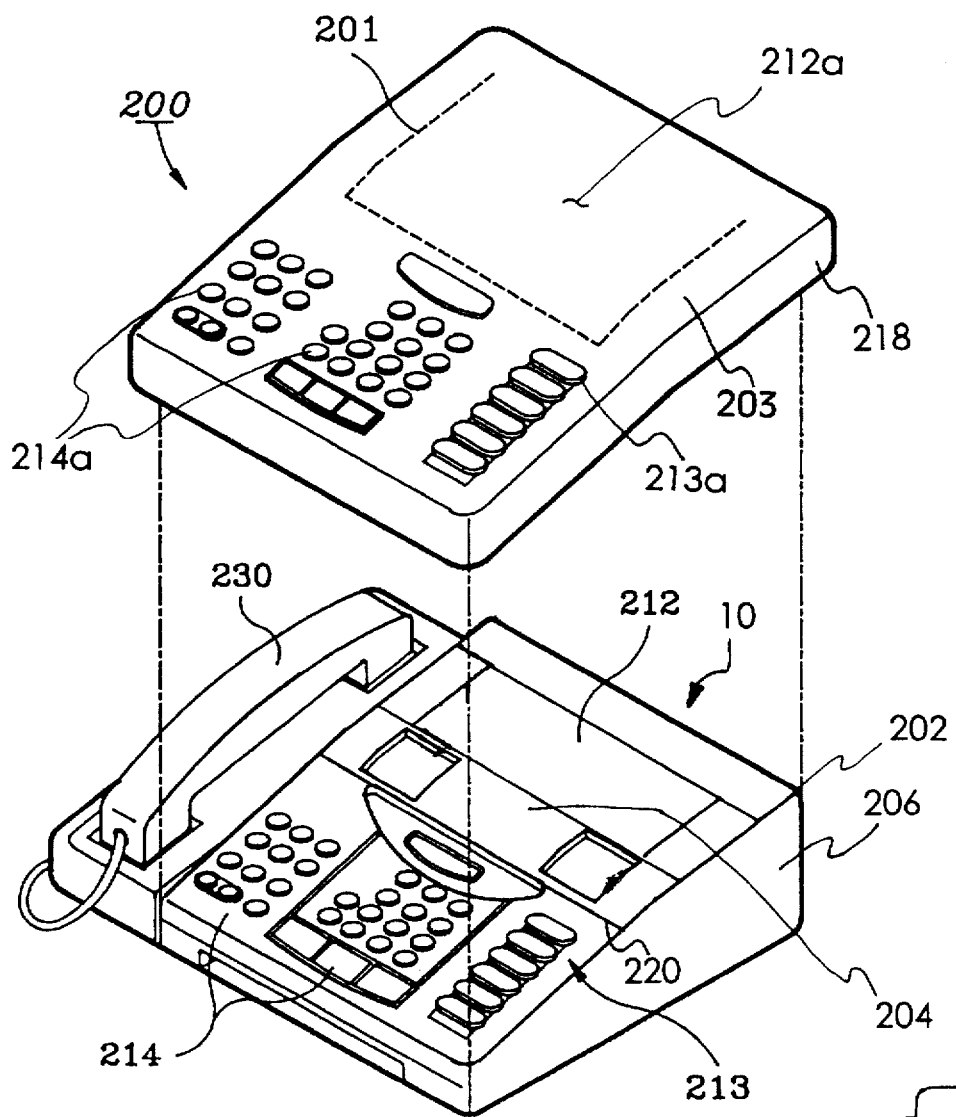
FIG. 2A is an assembly diagram showing a preferred embodiment of a dust cover for a facsimile apparatus according to the principles of the present invention.
Figure 2B:
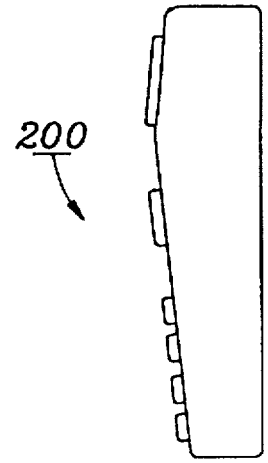
FIG. 2B is a side view of the dust cover shown by FIG. 2A.

Preferred embodiments of the present invention will be discussed hereinbelow with reference to the accompanying drawings. FIG. 2A is an assembly diagram showing installation of a preferred embodiment of a dust cover 200 fabricated according to the principles of the present invention for a unit of facsimile telecommunications apparatus 10. FIG. 2B is a side view of dust cover 200. Facsimile telecommunications apparatus 10 is encased in a housing 202 constructed with an upper, or top, surface generally indicated by reference numeral 204, and several generally vertically oriented adjoining sidewalls 206. Dust cover 200 is fabricated with a generally curved planar major surface 203 having a periphery bounded by adjoining skirts 218 integrally formed with major surface 203 as a single, flexible and continuous, monolithic structure. Skirts 218 depend vertically downwardly from major surface 203, and lie closely against side walls 206 of unit 10. Dust cover 200 covers the entire upper exposed portion 204 of the external housing 202 of main body including all of the keys protruding from the upper portion of housing 202 in several arrays defining a plurality of key operation panels 213 and 214. Document loading port 212 is also covered with dust cover 200. Receiver handset 230 of the facsimile apparatus, however, is not covered by dust cover 200.

Preferably, dust cover 200 is made of transparent or translucent material. Dust cover 200 is formed to have the same pattern as the key operation panels 213 and 214 as shown in FIG. 2B and is made of soft transparent or translucent material such as vinyl. Each of the individual keys and buttons in arrays 213, 214 are individually encased by corresponding flexible deformations 213a, 214a protruding outwardly from major surface 203.

A document loading port 212 of unit 10 forms a ramp serially receiving individual cut sheets of paper entering into the interior of unit 10; port 212 is accommodated by dust cover 200 being cut as shown, by a plurality of contorniate slits represented by dotted line 201 wholly within surface 203 and corresponding to the edges of port 212 so as to define a lip 212a, which is a minor part of the surface area of dust cover 200. This enables the surface area of lip 212a to be displaced from the major surface of dust cover 300 in order to make it possible to load documents into the document loading ramp 212 of facsimile apparatus 10 and to discharge documents therefrom.

Preferably, dust cover 200 is formed from a single layer of a flexible, resilient and transparent material impervious to water, and has a size, shape and location of deformities that conform the a facsimile telecommunications unit.

Accordingly, since dust cover 200 is made of flexible transparent or translucent material such as a vinyl plastic, it is possible to prevent the malfunctions or failures of facsimile apparatus 10 all too frequently caused by ambient dust, particles or spilled drinks, while maintaining operability of the basic facsimile functions thereof. When conformally installed across the entire width of exterior surface 204, dust cover covers, and protects, the key and button operated switches in arrays 213, 214, but also shields cracks and slots such as the division 220 between adjacent sections of upper to be protected from dust, particles or drinks such as water and other extraneous debris.

Figure 3:
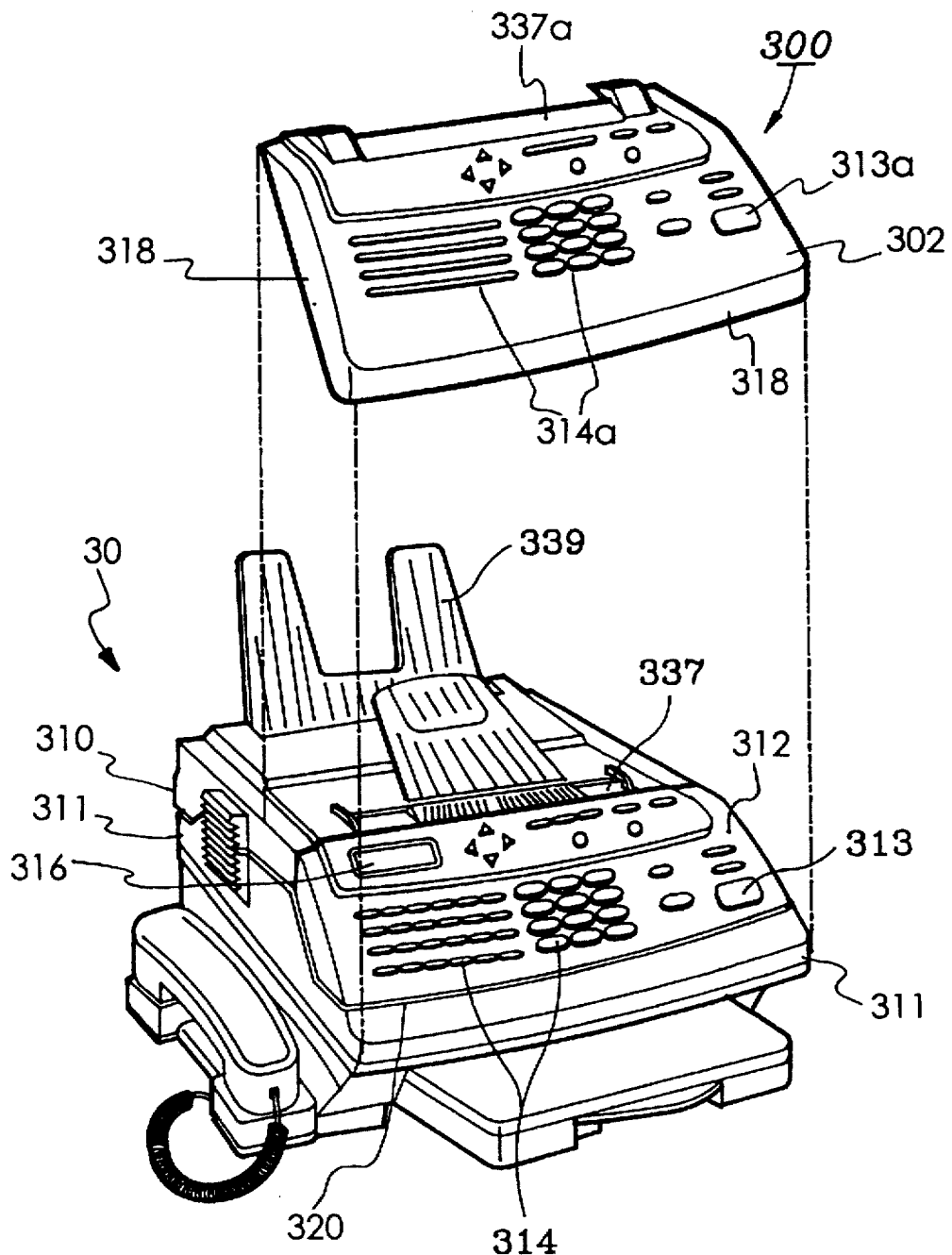
FIG. 3 is an assembly diagram showing another preferred embodiment for a dust cover of a facsimile telecommunications apparatus constructed according to the principles of the present invention.

FIG. 3 shows the construction of another preferred embodiment of a dust cover 300 for the facsimile apparatus 30 fabricated according to the principles of the present invention. The main body is constructed with a housing 310 having an exterior upper surface 312 perforated by functional buttons 313 and raised keys 314 arranged in distinct arrays of operational panels, as well as a variable visual display 316, that are covered with dust cover 300, and thereby protected from malfunction attributible to dust, particles or drinks spilled upon the facsimile apparatus. Housing 310 includes a document loading port 337 as well as a variable visual display 316 that are covered with dust cover 300, and are protected from malfunction attributible to dust, particles or drinks spilled upon facsimile apparatus 30. Dust cover 300 has a plurality of raised deformations 313a, 314a extending upwardly from its otherwise continuously smooth outer surface 302, with raised deformations 313a, 314a conforming in shape, size, and location to the functional buttons 313 and raised keys 314 in functional switch arrays perforating the surface of the upper portion of housing 310. A lip 337a integrally formed as a minor portion of dust cover 300, is partially separated by a plurality of contorniate slits (not readily visible in the oblique perspective view of FIG. 3) extending along three sides, so that lip 337a generally conforms to the ramp feeding cut sheets of documents into port 337.

Accordingly, when dust cover 300 is fitted around upper surface 312, functional buttons 313 and raised keys 314 are readily accommodated by, and encased within, raised deformations 313a, 314a, while skirts 318 descend vertically downwardly an lie against the corresponding sidewalls 311 of housing 310. Lip 337a then lies upon the ramp of port 337, and accommodates the serial feeding of individual cut sheets of documents into the interior of facsimile unit 30. Dust cover 300 extends across the entire width of upper surface 312, and covers the slot formed by seam 320 between the stationary and rotatably opening parts of upper surface 312. Functional and operational messages presented by visible display 316 are easily readable through dust cover 300. In this particular embodiment, document discharge port 339 is not covered with dust cover 300.

As described above, by covering the facsimile apparatus with the dust cover made of a transparent or translucent vinyl and the like, it is possible to prevent the key-sticking and other malfunctions by the facsimile apparatus due to interference or accumulations of dust, particles or spilled drinks, while maintaining the basic facsimile functions of the apparatus in an operational state.

While there has been illustrated and described what is considered to be preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A dust cover for a facsimile telecommunications apparatus, comprising:
a main body made of a flexible material having a major surface adapted to conform in size and shape to an exposed surface of the facsimile telecommunications apparatus with a plurality of discrete spaced-apart deformations in said flexible material located within said major surface adapted to conform in position, size and shape to a plurality of key operation panels located within said exposed surface, and with a flap formed in said flexible material located wholly within said major surface and spaced-apart from boundries of said major surface for providing an opening to a document loading port providing access into an interior of the facsimile telecommunication apparatus; and a plurality of side panels made of said material integral with and adjoining said boundries to form a skirt for covering sides of the facsimile telecommunications apparatus except a telephone receiver attached to one of the sides of the facsimile telecommunications apparatus.

2. The dust cover of claim 1, comprised of said plurality of discrete spaced-apart deformations formed with a pattern.

3. The dust cover of claim 2, comprised of said dust cover being made of a material selected from among flexible transparent and flexible translucent materials.

4. The dust cover of claim 2, comprised of said flap adapted for accommodating loading and issuing of documents from the facsimile telecommunications apparatus via the document loading port.

5. The dust cover of claim 1, comprised of said dust cover being made of a material selected from among flexible transparent and flexible translucent materials.

6. The dust cover of claim 5, comprised of said flap adapted to accommodate insertion of documents into the facsimile telecommunications apparatus via the document loading port.

7. The dust cover of claim 1, comprised of said flap adapted to accommodate insertion of documents from the facsimile telecommunications apparatus via the document loading port.

8. The cover of claim 7, comprised of said major surface absent said flap forming an uninterrupted continuous spread for enveloping a majority of the exposed surface of the facsimile telecommunications apparatus.

9. The cover of claim 7, comprised of said major surface adapted to extend across an entirety defined by a width of the exposed surface and form an uninterrupted continuous spread enveloping a majority of the exposed surface of the facsimile telecommunications apparatus.

10. The cover of claim 1, comprised of said major surface absent said flap forming an uninterrupted continuous spread for enveloping a majority of the exposed surface of the facsimile telecommunications apparatus.

11. The cover of claim 1, comprised of said major surface adapted to extend across an entirety defined by a width of the exposed surface and form an uninterrupted continuous spread enveloping a majority of the exposed surface of the facsimile telecommunications apparatus.

12. A dust cover, comprising:

a major surface formed from a single layer of a flexible, resilient and transparent material impervious to water, said major surface adapted to conform in size, shape and position to an upper portion of a facsimile telecommunication unit and containing a plurality of spaced-apart deformations of said surface adapted to conform in size, shape and location to corresponding individual ones of a plurality of features on the upper portion of the facsimile telecommunication unit;

said major surface being perforated by a plurality of continuous slits for corresponding in location to edges of a ramp extending between the upper portion and an interior of the facsimile telecommunication unit, with said slits beginning and terminating wholly within said major surface to define a minor surface of said material displacable along said slits from a continuum defined by said major surface and positionable upon the ramp; and a plurality of continously adjoining side panels of said material forming a skirt integral to a periphery of said major surface and for conforming to sidewalls of the unit.

13. The cover of claim 12, comprised of said major surface absent said minor surface forming an uninterrupted continuous spread for enveloping a majority of the upper portion of the unit.

14. The cover of claim 12, comprised of said major surface adapted to extend across an entirety defined by a width of the upper portion and forming an uninterrupted continuous spread for enveloping a majority of the upper portion of the unit.

15. A dust cover, comprising:

a major surface formed from a single layer of a flexible, resilient and transparent material impervious to water, said major surface adapted to conform in size, shape and position to an upper portion of a facsimile telecommunication unit and containing a plurality of spaced-apart deformations of said surface adapted to conform in size, shape and location to corresponding individual ones of a plurality of features on the upper portion of the facsimile telecommunication unit;

said major surface extending across and forming an uninterrupted continuous spread for enveloping a majority of the upper portion of the unit;

said major surface being perforated by a plurality of continuous slits adapted to correspond in location to edges of a ramp extending between the upper portion and an interior of the facsimile telecommunication unit, with said slits beginning and terminating wholly within said major surface to define a minor surface of said material displacable along said slits from a continuum defined by said major surface and positionable upon the ramp; and a plurality of continuously adjoining side panels of said material forming a skirt integral to a periphery of said major surface and for conforming to sidewalls of the unit.

16. The dust cover of claim 15, comprised of said dust cover being made of a material selected from among flexible transparent and flexible translucent materials.

* * * * *